United States Patent Office 3,309,369
Patented Mar. 14, 1967

3,309,369
IMIDAZO- AND PYRIMIDO-QUINAZOLINES
Othmar Schindler, Gurzelen (Gurbetal), im Einschlag, Switzerland, assignor to Dr. A. Wander, S.A., Bern, Switzerland, a Swiss corporation
No Drawing. Filed Apr. 11, 1966, Ser. No. 551,820
7 Claims. (Cl. 260—256.4)

This application is a continuation-in-part application of my copending U.S. patent application Ser. No. 387,184, filed Aug. 3, 1964, and now abandoned.

It has been found that some new 2,3,5,6-tetrahydro-imidazo[1,2-c]quinazoline and 2,3,6,7 - tetrahydro - 4H-pyrimido-[1,2-c]quinazoline derivatives have an adrenomimetic action and have utility as bronchospasmolytics, as psychoanaleptics and as antidepressants. They are compounds having the general formula:

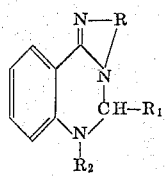

(I)

as well as acid addition salts thereof. In Formula I, R denotes alkylene with 2 or 3 carbon atoms; $R_1$ denotes cycloalkyl with from 5 to 7 carbon atoms, furyl, thienyl, phenyl, benzyl, substituted phenyl, or substituted benzyl, the substituents in the substituted phenyl and benzyl being halogen, trifluoromethyl, lower alkyl, lower alkoxy, or lower alkylthio; and $R_2$ represents hydrogen or lower alkyl. By "lower" alkyl, alkoxy or alkylthio is meant one containing from 1 to 3 carbon atoms.

The said compounds are obtained by reaction of o-(2-imidazolin-2-yl)anilines or o-(1,4,5,6-tetrahydro-pyrimidin-2-yl)-anilines of the formula:

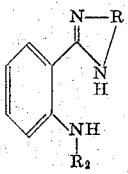

(II)

wherein R and $R_2$ have the above-mentioned meaning, or acid addition salts thereof, with aldehydes of the formula:

$$R_1—CHO \quad (III)$$

wherein $R_1$ has the stated meaning, the products being isolated, if desired, in the form of acid addition salts. The reaction is suitably carried out in an acid medium, such as alcoholic hydrochloric acid. Starting materials of Formula II can be produced, for example, by reacting (if required N-alkylated) anthranilic acid alkyl esters, anthranilic acid thioamides or anthranilic acid imidoethers with diamines of the formula $H_2N—R—NH_2$, wherein R has the meaning stated earlier.

Products of Formula I, in which $R_2$ denotes hydrogen, are also obtained by treating corresponding compounds which are completely unsaturated in the quinazoline part of the molecule and which are of the formula:

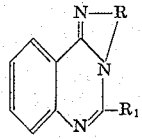

(IV)

wherein R and $R_1$ have the above-mentioned meaning, with a mild reducing agent, for instance with hydrogen in the presence of a noble metal catalyst, such as palladium-carbon, or with an alkali metal boron hydride, the products being isolated as free bases or, if desired, in the form of acid addition salts. An alkyl residue $R_2$ can if desired be subsequently introduced into the hydrogenated compound, for instance by treatment of the latter with an alkyl halide.

The starting materials of Formula IV required for hydrogenation are formed, for example, by reacting compounds of Formula II with acid chlorides or acid anhydrides of the formula $R_1—CO—Cl$ or $(R_1—CO)_2O$ respectively, by treating quinazoline derivatives of the formula

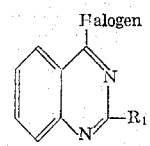

with amine halides of the formula $H_2N—R$-halogen, or by treating anthranilic acid derivatives of the formula

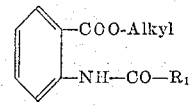

with diamines of the formula $H_2N—R—NH_2$, R and $R_1$ in all these formulae having the above-mentioned meaning.

The conversion of the bases of this invention into their acid addition salts is performed in the usual way, by treatment with suitable acids, such as hydrohalic acids, sulphuric, nitric, phosphoric, acetic, oxalic, malonic, succinic, maleic, tartaric, or toluene-sulphonic acids and the like.

The adrenomimetic action of the compounds of this invention is manifested, for instance, in the bronchospasmolysis test of H. Konzett and R. Rössler [Arch. exp. Path. Pharmakol. 195 (1940)]. In this test, the bronchospasm caused by intravenous injection of histamine and its reduction effected by bronchospasmolytic agents are determined by measuring the respiratory volume. In this test, the compounds of Formula I wherein R denotes trimethylene are, in general, more effective than those wherein R denotes dimethylene; however, the latter show still considerable action. Particularly intense bronchospasmolytic action is obtained with 6-phenyl-2,3,6,7-tetrahydro-4H-pyrimido[1,2-c]quinazoline and its derivatives substituted in the p-position of the phenyl residue.

Within the pattern of adrenomimetic activity, psychoanaleptic and antidepressive effect components are shown by those compounds of Formula I, wherein R denotes dimethylene, and especially by 5-phenyl- and 5-p-chlorophenyl - 2,3,5,6 - tretrahydro-imidazo[1,2-c]quinazoline. This property is evidenced by the results of the anti-tetrabenazine test in the rat. For this purpose the experimental animal is given by i.p. injection 10 mg./kg. of tetrabenazine (2-oxo-3-isobutyl-9,10-dimethoxy-1,2,3,4,6,7-hexahydro-11bH-benzo[a]quinolizine) 1 hour after i.p. administration of the test substance. Animals which have not been pretreated then show a cataleptic posture for at least 45 seconds as well as ptosis. In animals pretreated with psychoanaleptics this effect is abolished or diminished.

In Table I the bronchospasmolytic action and the anti-tetrabenazine action of compounds according to this invention are compared with the corresponding data on known bronchospasmolytic agents (ephedrine, theophylline) and psychoanaleptics (imipramine [5-(3'-dimethylaminopropyl)-10,11-dihydro - 5H-dibenz-[b,f]azepine hydrochloride]). In the first and second columns on the right of the table, ED 50 is the dose of active substance which lowers the tetrabenazine effect to 50% of the controls. Posture duration serves as a measure in catalepsy and palpebral fissure width in ptosis. In the third column from the right, ED 50 denotes the amount of active substance which in the test of Konzett and Rössler brings about a 50% reduction of the bronchospasm induced by histamine.

TABLE I

| Active substance | Toxicity (mouse) LD 50, mg./kg. orally | Bronchospasmolysis (guenia pig) ED 50, mg./kg. i.v. | Anti-tetrabenazine effect (rat) ED 50, mg./kg. i.p. | |
|---|---|---|---|---|
| | | | Catalepsy | Ptosis |
| 6-Phenyl-2,3,6,7-tetrahydro-4H-pyrimido[1,2-c]quinazoline | 125 | 0.015 | | |
| 6-p-Chlorophenyl-2,3,6,7-tetrahydro-4H-pyrimido[1,2-c]quinazoline | 68 | 0.015 | | |
| 6-p-Methoxyphenyl-2,3,6,7-tetrahydro-4H-pyrimido[1,2-c]quinazoline | 740 | 0.04 | | |
| 6-(1-Thienyl)-2,3,6,7-tetrahydro-4H-pyrimido[1,2-c]quinazoline | 117 | 0.1 | | |
| 5-Phenyl-2,3,5,6-tetrahydro-imidazo[1,2-c]quinazoline | 160 | >0.1 | 1.9 | 1.2 |
| 5-p-Chlorophenyl-2,3,5,6-tetrahydro-imidazo[1,2-c]quinazoline | 220 | 0.1 | 2.3 | 1.4 |
| 5-(1-Furyl)-2,3,5,6-tetrahydro-imidazo[1,2-c]quinazoline | 120 | 0.1 | | |
| 6-p-Methylphenyl-2,3,6,7-tetrahydro-4H-pyrimido[1,2-c]quinazoline | 210 | 0.015 | | |
| Ephedrine (known bronchospasmolytic agent) | 400 | 2 | | |
| Theophylline (known bronchospasmolytic agent) | 540 | 3 | | |
| Imipramine (known psycho-analeptic agent) | 400 | | 12 | 11 |

From the table it is evident that the substances according to the invention are active in smaller quantities than the reference substances.

The psycho-analeptic action of substances according to the invention differs not only quantitatively, but also qualitatively from that of imipramine, as evidenced by the altogether different electro-encephalographic patterns pertaining to the two drugs.

Example 1

4.0 gm. of o-(1,4,5,6-tetrahydropyrimidin-2-yl)aniline hydrochloride and 4.2 ml. of benzaldehyde are stirred in 80 ml. of 15% alcoholic hydrochloric acid for 36 hours at room temperature. The reaction mixture is concentrated by evaporation in vacuo. The resulting yellow oil is mixed with ice and 2-n soda lye. The mixture is extracted with chloroform. The chloroform extract is washed with water and concentrated sodium chloride solution and concentrated by evaporation. By recrystallization of the resulting solid from methanol/ether 3.2 gm. of 6-phenyl-2,3,6,7-tetrahydro-4H-pyrimido[1,2-c]quinazoline are obtained in the form of white prisms with a fusion point of 182–187° C.

Example 2

750 mg. of 5-phenyl-2,3-dihydro-imidazo[1,2-c]quinazoline hydrochloride, obtained by reaction of o-(2-imidazolin-2-yl)aniline with benzoic acid chloride, are dissolved in 200 ml. of methanol. A solution of 640 mg. of potassium boron hydride in 5 ml. of water is added. The reaction mixture is set aside for 24 hours at 20° C. and pH 9–10 and then concentrated in vacuo to a volume of 15 ml. After adding 20 ml. of water the mixture is made alkaline with 1 ml. of 2-n soda lye and exhaustively extracted with chloroform. The chloroform solution is washed with dilute hydrochloric acid and water, dried over sodium sulphate, filtered through activated aluminium oxide and concentrated by evaporation. By recrystallization of the resulting solid from methanol/ether 210 mg. of 5-phenyl-2,3,5,6-tetrahydro-imidazo[1,2-c]quinazoline are obtained in the form of hexagonal plates, of fusion point 191–197° C.

By proceeding in the same way as in the above examples, other products according to Formula I as listed in Table II can, for example, be obtained from the corresponding starting substances. In this table, R, $R_1$ and $R_2$ are the corresponding groups according to Formula I.

TABLE II

| Example | Product according to formula I | | | Form | Fusion point °C. |
|---|---|---|---|---|---|
| | R | $R_1$ | $R_2$ | | |
| 3 | —(CH$_2$)$_3$— | —⟨phenyl⟩—OCH$_3$ | H | Hydrochloride | 289–291.5 |
| 4 | —(CH$_2$)$_2$— | —⟨phenyl⟩—Cl | H | do | 290–295 |
| 5 | —(CH$_2$)$_2$— | —⟨phenyl⟩—Cl | H | Base | 175–180 |
| 6 | —(CH$_2$)$_2$— | —⟨furyl (O)⟩ | H | do | 163–165 |
| 7 | —(CH$_2$)$_2$— | —⟨thienyl (S)⟩ | H | do | 268–276 |
| 8 | —(CH$_2$)$_2$— | —⟨phenyl⟩—H | H | do | 185–190 |

TABLE II—Continued

| Example | R | R₁ | R₂ | Form | Fusion point, °C. |
|---|---|---|---|---|---|
| 9 | $-(CH_2)_2-$ | $-CH_2-C_6H_5$ (benzyl) | H | do | 160–162 |
| 10 | $-(CH_2)_3-$ | thienyl | H | do | 172–174 |
| 11 | $-(CH_2)_2-$ | $-C_6H_4-OCH_3$ | H | Oxalate | 180–184 |
| 12 | $-(CH_2)_2-$ | $-C_6H_4-Cl$ | $-CH_3$ | Base | 176–180 |
| 13 | $-(CH_2)_2-$ | $-C_6H_5$ | $-CH_3$ | Oxalate | 195–198 |
| 14 | $-(CH_2)_3-$ | furyl | H | Base | 156–158 |
| 15 | $-(CH_2)_3-$ | cyclohexyl (H) | H | do | 155–160 |
| 16 | $-(CH_2)_3-$ | $-C_6H_4-Cl$ | $-CH_3$ | do | 154–157 |
| 17 | $-(CH_2)_3-$ | $-C_6H_5$ | $-CH_3$ | do | 82–90 |
| 18 | $-(CH_2)_3-$ | $-C_6H_4-CH_3$ | H | do | 180–182 |
| 19 | $-(CH_2)_2-$ | $-C_6H_4-CH_3$ | H | do | 198–203 |

Preparation of tablets

For the manufacture of tablets, the products of this invention can be mixed with lactose and granulated with water, 0.5% sodium alginate or 1% gelatine solution. The dried granulate is compressed into tablets in the presence of about 5% of talcum, 5% of corn starch and 0.1% of magnesium steerate. In this way, there are obtained, e.g., tablets of the following composition:

| | Mg. |
|---|---|
| 5 - p - chlorophenyl - 2,3,5,6 - tetrahydroimidazo[1,2-c]quinazoline | 4 |
| Lactose | 30 |
| Corn starch | 4 |
| Talcum | 2 |
| Magnesium stearate | 0.1 |

These 40 mg. tablets can be administered orally in a dosage of 5 to 15 tablets per day in the treatment of patients suffering from states of mental depression.

I claim:

1. A compound selected from the class consisting of A: 2,3,5,6-tetrahydro-imidazo[1,2-c]quinazoline and 2,3,6,7-tetrahydro-4H-pyrimido[1,2-c]quinazoline derivatives of the formula:

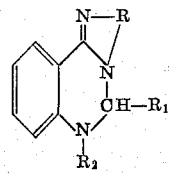

wherein R denotes alkylene with 2 or 3 carbon atoms; R₁ is a member of the group consisting of cycloalkyl with from 5 to 7 carbon atoms, furyl, thienyl, phenyl, benzyl, substituted phenyl, and substituted benzyl, the substituent in said substituted phenyl and substituted benzyl being selected from the group consisting of halogen, trifluoromethyl, lower alkyl, lower alkoxy, and lower alkylthio; and R₂ is a member of the group consisting of hydrogen and lower alkyl; and B: acid addition salts of A.

2. 5 - phenyl - 2,3,5,6 - tetrahydro-imidazo[1,2-c]quinazoline, as in claim 1.

3. 5 - p - chlorophenyl-2,3,5,6-tetrahydro-imidazo[1,2-c]quinazoline, as in claim 1.

4. 6 - phenyl - 2,3,6,7-tetrahydro-4H-pyrimido-[1,2-c]-quinazoline, as in claim 1.

5. 6 - p - chlorophenyl-2,3,6,7-tetrahydro-4H-pyrimido-[1,2-c]quinazoline, as in claim 1.

6. 6 - p - methoxyphenyl - 2,3,6,7-tetrahydro-4H-pyrimido-[1,2-c]quinazoline, as in claim 1.

7. 6 - p - methylphenyl - 2,3,6,7 - tetrahydro-4H-pyrimido-[1,2-c]quinazoline, as in claim 1.

No references cited.

ALEX MAZEL, Primary Examiner.
MARY U. O'BRIEN, Assistant Examiner.